Nov. 17, 1936.                P. COIFFU                2,061,140
                        MANUFACTURE OF CEMENT
                         Filed March 30, 1934

Fig. 1.

Fig. 2.

Inventor
Pierre Coiffu.

By
                                        Attorney

Patented Nov. 17, 1936

2,061,140

UNITED STATES PATENT OFFICE 2,061,140

MANUFACTURE OF CEMENT

Pierre Coiffu, Paris, France, assignor to Societe des Ciments Francais et des Portland de Boulogne-sur-Mer et Compagnie des Portland de Desvres, Paris, France, registered under the laws of France Application March 30, 1934, Serial No. 718,307
In France April 25, 1933

9 Claims. (Cl. 106—25)

When aluminous cement or non-smelted Portland cement is manufactured by clinkerization, the particles of clinker are removed at the lower part of the furnace, the cooling of the clinker during the circulation of the latter in the furnace between the burning zone and the outlet being considered as the first part of the normal cooling process, the second part of which is carried out in special coolers either to recover the sensible heat of the clinker or in order to allow it to be further handled.

The said process does not enable me to obtain in a regular way a clinker which is perfectly white.

Such result is obtained according to the present invention in which the clinker is directly carried from the hottest zone of the furnace into a cooler in which the burnt material is subjected to a rapid cooling while being screened from the air or from any other gas having a high oxygen content.

It is surprising to notice that the clinker treated in accordance with the invention, that is to say removed from the furnace at its maximum temperature and cooled while being screened from the air is of a very much lighter shade than if the clinker had been removed from the furnace at its lower end and cooled while being screened from the air under the same conditions.

If the cooling of the clinker leaving the hottest zone is carried out in the presence of water gas, producer gas or steam in a closed vessel, the shade is much lighter than if the clinker was extracted from the lower end of the furnace at a lower temperature.

If the clinker removed from the hottest zone is suddenly cooled by means of a stream of water, it undergoes a substantial lightening while the same treatment applied to the clinker leaving the lower part of the furnace at a lower temperature produces little or no lightening.

Finally, the clinkers removed from the hottest zone and quenched in a stream of steam or of water are subjected to a quenching action which enables to obtain by a cold process the constituents which exist at a high temperature. Thus, high quality products are obtained having higher resistances than if they leave the furnace at the usual temperature. Furthermore, the physical effect of the sudden cooling produces a cracking of the clinkers which makes their crushing more easy.

All these effects are produced at a high temperature and the clinkers may be removed from the water at a temperature above 400° C. without difficulty, that is to say without causing any change in the physical qualities or in the colour acquired. When removed from the water at this temperature, they dry by themselves when they are exposed to the air.

In order to carry directly the clinker from the hottest zone of the furnace into the cooler, the burnt material will be discharged through the holes provided to this end in the walls of the rotary furnace and at the level of the hottest zone.

The operating conditions of a rotary furnace are not always the same. Displacements of the zone of maximum heat take place. In order to be able to follow these displacements, according to the invention, holes have been distributed in different planes perpendicular to the axis of the furnace. In this way when the zone of maximum temperature is low, the lowest holes will be opened and the others will be plugged. If the zone of maximum temperature rises, the lowest hole will be opened and the hole immediately above the same will be again opened etc.

In order to avoid oxidation of the clinker at its exit from the holes and any in-leakage of air into the furnace, a tight casing, covering the whole or part of the holes, may be used.

Instead of providing holes in the furnace itself, a fixed fore-chamber may be provided, of cylindrical form, for example, in front of the lower end of the furnace. The length of the fore chamber will then be such that the place at which the furnace and the said chamber meet will correspond to the hottest point of the flame. The clinker will leave the furnace, pass between the furnace and the fore-chamber and will be immediately cooled.

Referring to the accompanying drawing, which is solely by way of illustration, Figs. 1 and 2 are fragmentary sections through two forms of my invention.

Referring more particularly to Fig. 1, the lower end of the rotatable drum is shown at 1, and as having a plurality of annular rows of openings adjacent its lower end, two rows 2 and 3 being shown in the drawing. These annular rows are distributed in different planes perpendicular to the axis of the furnace. A burner is represented conventionally at 4, projecting at flame 5 into the lower, free end of the drum. The walls of the drum are shown as thickened in the region 6, in order better to withstand the intense heating of the flame 5. So that the material can be discharged from the zone of strongest heating in the film, the region adjacent the holes 2 and 3 preferably is surrounded by an annular jacket 7, terminating at its bottom-most portion in a throat 8 which empties into a container 9.

The modification of Fig. 2 is quite similar to that of Fig. 1 except that the lowermost end of the drum 10 is confronted by a fixed fore-chamber 1, preferably of cylindrical form, the length of this fore-chamber being such that the region at which the drum and the said fore-chamber are juxtaposed corresponds to the hottest point of the flame 5.

According to the invention, calcium fluoride or calcium chloride or a mixture of both substances may be added to the raw material before its introduction into the furnace, the mixture thus obtained being treated as mentioned above.

Good results have been obtained by adding to the raw material either 2-5% of calcium chloride or 2-5% of calcium fluoride or 2-6% of mixtures of calcium chloride and calcium fluoride.

Having now particularly described and ascertained the nature of my invention and in what manner the same is to be performed, I declare that what I claim is:

1. The process for the manufacture of white cement clinker, comprising burning the typical Portland cement mix in a furnace, to incipient fusion, removing the burnt materials immediately after burning while they are at a temperature substantially equal to the maximum temperature they attain in the furnace, and immediately cooling by water the burnt material before the temperature thereof has had an opportunity of becoming lower than that at which the material leaves the furnace.

2. A process for the manufacture of white cement clinker, comprising adding a calcium halide to the usual calcareous and argillaceous materials, mixing the halide with said other materials, burning the materials thus mixed in a furnace to incipient fusion, removing the burnt materials immediately after burning while they are at a temperature substantially equal to the maximum temperature they attain in the furnace, and immediately cooling by water the burnt material before the temperature thereof has had an opportunity of becoming lower than that at which the material leaves the furnace.

3. Process for the manufacture of white cement clinker, comprising adding to the usual calcareous and argillaceous materials, a calcium halide, mixing the said halide with the other materials, burning the materials thus mixed in a furnace, removing the burnt materials immediately after their burning in such manner that they leave the furnace at a temperature substantially equal to the maximum temperature they attain in the furnace, maintaining the burnt material out of contact with an oxygen-containing gas, and cooling by water the burnt material before the temperature of the material has had an opportunity of lowering itself below that at which the material departs from the furnace.

4. Process for the manufacture of white cement clinker, comprising adding to the usual calcareous and argillaceous materials, a calcium chloride, mixing the said chloride with the other materials, burning the materials thus mixed in a furnace, removing the burnt material immediately after their burning in such manner that they leave the furnace at a temperature substantially equal to the maximum temperature they attain in the furnace, maintaining the burnt material out of contact with an oxygen-containing gas and cooling by water the burnt material before the temperature of the material has had an opportunity of lowering itself below that at which the material departs from the furnace.

5. Process for the manufacture of white cement clinker, comprising adding to the usual calcareous and argillaceous materials, a calcium fluoride, mixing the said fluoride with the other materials, burning the materials thus mixed in a furnace, removing the burnt materials immediately after their burning in such manner that they leave the furnace at a temperature substantially equal to the maximum temperature they attain in a furnace, maintaining the burnt material out of contact with an oxygen-containing gas, and cooling by water the burnt material before the temperature of the material has had an opportunity of lowering itself below that at which the material departs from the furnace.

6. Process for the manufacture of white cement clinker, comprising adding to the usual calcareous and argillaceous materials, a mixture of calcium fluoride and calcium chloride, mixing the said mixture of fluoride and chloride with the said usual materials, burning the materials thus mixed in the furnace, removing the burnt materials immediately after their burning in such manner that they leave the furnace at a temperature substantially equal to the maximum temperature they attain in the furnace, maintaining the burnt material out of contact with an oxygen-containing gas, and cooling by water the burnt material before the temperature of the material has had an opportunity of lowering itself below that at which the material departs from the furnace.

7. Process for the manufacture of white cement clinker, comprising adding to the usual calcareous and argillaceous materials, a calcium halide, mixing the said halide with the other materials, burning the materials thus mixed in a furnace, removing the burnt materials immediately after their burning in such manner that they leave the furnace at a temperature substantially equal to the maximum temperature they attain in the furnace, maintaining the burnt material out of contact with an oxygen-containing gas, and cooling by water the burnt material in an airtight enclosure communicating with the furnace before the material has had an opportunity to lower its temperature from that at which it leaves the furnace.

8. Process for the manufacture of white cement clinker, comprising adding to the usual calcareous and argillaceous materials, a calcium halide, mixing the said halide with the other materials, burning the materials thus mixed in a furnace, removing the burnt materials immediately after their burning in such manner that they leave the furnace at a temperature substantially equal to the maximum temperature they attain in the furnace, maintaining the burnt material out of contact with an oxygen-containing gas and cooling by water the burnt material by immersing the same as it leaves the furnace in a non-oxidizing fluid, before the material has had an opportunity to lower its temperature from that at which it leaves the furnace.

9. Process for the manufacture of white cement clinker, comprising adding to the usual calcareous and argillaceous materials, a calcium halide, mixing the said halide with the other materials, burning the materials thus mixed in a furnace, removing the burnt materials immediately after their burning in such manner that they leave the furnace at a temperature substantially equal to the maximum temperature they attain in the furnace, maintaining the material out of contact with an oxygen-containing gas, and cooling by water the burnt material by immersing the same in water, before the material has had an opportunity to lower its temperature below that at which it leaves the furnace, until the material has reached a temperature in the neighborhood of 400° C.

PIERRE COIFFU.